United States Patent Office 2,970,561
Patented Feb. 7, 1961

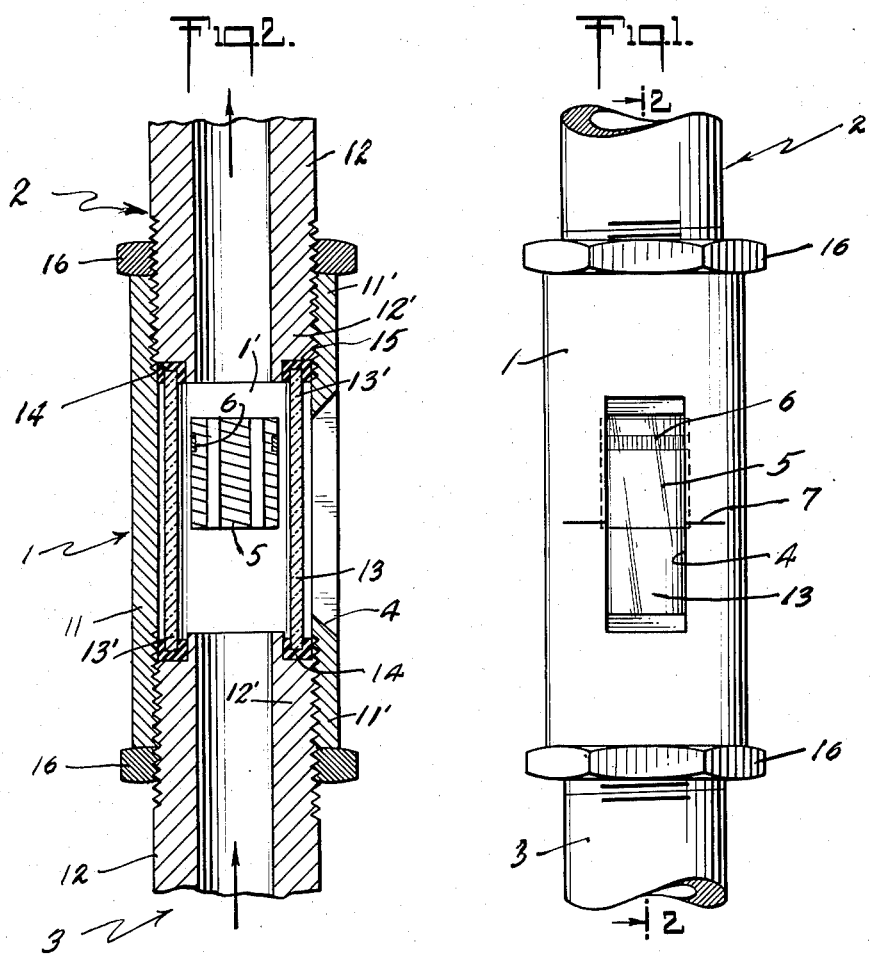

2,970,561

FLUID FLOW INDICATORS

George A. Ashwood, Minneapolis, Minn., assignor, by mesne assignments, to the United States of America as represented by the Secretary of the Navy Filed Apr. 3, 1959, Ser. No. 804,056

4 Claims. (Cl. 116—117)

This invention relates to indicators by which one may at all times ascertain whether or not a fluid is moving through a confining conduit.

Objects of the invention are, to provide a simple, practical, compact fluid flow indicator for a conduit, which in use requires no servicing attention after installation, which may be used for any fluids, both gaseous and liquid, upon change in the indicating member, which automatically indicates the presence of a clogged line or conduit, which may be manufactured easily and largely from standard tubing and stock materials, and which will be relatively inexpensive, and trouble free in use.

Other objects and advantages will appear from the following description of one embodiment of the invention, and the novel features will be particularly pointed out hereinafter in connection with the appended claims.

In the accompanying drawing:

Fig. 1 is a front elevation of an indicator constructed in accordance with this invention;

Fig. 2 is a longitudinal sectional elevation of the same, the section being taken approximately along the line 2—2 of Fig. 1;

Fig. 3 is a side elevation of the indicating member of the same;

Fig. 4 is an end elevation of the same; and

Fig. 5 is a longitudinal sectional elevation of the same, the section being taken approximately along the line In the illustrated embodiment of the invention, the indicator includes a tubular casing or conduit 1 with a passage 1' therethrough from end to end and having end terminals 2 and 3 by which it can be incorporated in an upright position in a fluid confining conduit upwardly through which fluid flow may occur, and the existence of which flow one desires to verify. The casing 1 has a window 4 through which the flow is visible, and within the passage of the casing is an indicator member 5 whose position along the casing passage is visible through the window 4. The member 5 has a density selected in accordance with the particular fluid whose flow through the casing is to be indicated. For each fluid, an indicating member 5 is selected which has a density slightly greater than such fluid, so that the indicating member will slowly settle in the fluid surrounding it when the fluid is not in motion, but will be carried upwardly by the fluid that passes upwardly through the casing passage in suspension in such fluid.

In a lighter fluid, such as a gaseous fluid, the indicating member 5 obviously should be less than when the fluid is heavier such as a liquid. If the liquid is a heavy one the density of the indicating member 5 should be heavier. If the indicating member 5 is at the bottom of the window, it is quite apparent from a mere glance at the window, that no fluid is flowing upwardly in the conduit and casing passage. If the member 5 is at the top of the window, it will be apparent at a glance that the fluid is flowing upwardly through the casing passage. If one observes the indicating member 5 at the bottom of the window when fluid should be flowing in the conduit upwardly through the casing passage, it is apparent at a glance at window 4 that there is a clogged or plugged conduit, and it should be corrected at once.

The indicating member may advantageously have a peripheral mark or band 6 that contrasts in color from the fluid and the rest of the member, to serve as a reference mark that may cooperate with reference marks 7 on the casing at the window, to indicate by the position of the band 6 relatively to the marks 7 whether or not fluid is moving upwardly through the casing passage. This band 6 may be formed on the member 5 in any suitable manner. One simple way of providing such a marker band is to provide a shallow annular groove or channel 8 (Fig. 5) in the periphery of the member, and fill that groove or channel with a marking paint or coating having a color contrasting with the color of the peripheral surface of the member 5 and of the fluid filling the casing passage.

The member 5 has substantial clearance with the surrounding wall of the casing passage, so that the member 5 may rise and fall freely in the casing passage without friction. The member 5 also preferably should be longer than its diameter or transverse dimension to reduce danger of its binding in the casing passage, and it is also so formed that it only partially obstructs fluid flow past it along the casing passage. To this end the member 5 preferably has one or more passages 10 extending from end to end therethrough, and while these passages may be in the form of channels running lengthwise of the member in its periphery they are preferably in the interior of the member as shown.

The casing 1 is preferably formed of standard tubing and stock in order to reduce the cost and facilitate manufacture. This casing includes a length of a standard tube 11, internally threaded at its ends 11', and lengths of standard tubes or conduit 12 externally threaded at their ends 12', which threaded ends are threaded, one into each end of the tube 11. The tube 11 is provided, intermediate of its ends, with an open aperture forming the window 4, but the tubes 12 are not threaded into tube 11 as far as the ends of window 4. A tube 13 of transparent material is disposed in the tube 11 between the tubes 12, and it may, for example, be of heat resistant or other glass, or of transparent plastic material. An annular gasket ring 14 of elastic material is disposed between each tube length 12 and the adjacent end of the tube length 13 to prevent fluid leakage from the ends of the transparent tube 13. Preferably, each gasket ring 14 is channel-shaped in transverse cross section, with the channel receiving snugly the adjacent end of the transparent tube 13. By screwing the tube lengths 12 into the tube 11 to different extents, they engage the ends 13' of the transparent tube 13, with interposed gasket rings 14, and hold tube 13 in proper position within tube 11 opposite window 4, which position of tube 13 can be adjusted to some extent in a direction lengthwise of the tube 11.

The gasket ring 14 prevents leakage of fluid around the ends of the transparent tube. The ends of tubes 12 within tube 11 have rabbet grooves 15 formed in their outer corner edges to hold the adjacent gasket ring 14 in position, and to thereby center the transparent tube 13. The internal diameters of the ends of tubes 12 are less than the outside diameters of the ends of the indicator member 5 so as to prevent exit of the member 5 in both directions from the transparent tube 13 when the parts are assembled as shown. The indicator member 5 is disposed within the transparent tube 13 and has a cross-sectional dimension such that it will be prevented from passing into either tube 12 and yet of such dimension whereby the free flow of fluid through the tube 13 will not be impeded. The indicator is of sufficient length so as to be able to move along the tube without binding. When the tubes 12 are adjusted into the ends of tube 11 to the desired extent, a lock nut 16 threaded on the exterior of each tube 12 is adjusted thereon to abut against the adjacent end of tube 11 to hold its tube 12 against unintentional release or against backing out of tube 11.

In use the casing 1 is disposed in an upright position and connected in series in the conduit to form a part thereof, with the fluid flow always in a direction upwardly in the conduit through the casing 1. When the fluid flow is upwardly in this portion of the conduit, it will lift or carry the indicator 5 to its upper position in transparent tube 13, and one can observe this position of the indicating member 5 through the window 4. The color of member 5, or its indicator band 6, will contrast with the color of the fluid flowing in the conduit, so that the position of member 5 may be ascertained by merely looking through window 4. If the conduit becomes plugged or clogged, so that flow of fluid therethrough stops, or if the flow is intentionally cut off, the indicating member 5 will slowly settle in the fluid in the conduit until stopped by the end of the lower tube 12, and its position so obtained will be readily visible through the window 4 that indicates there is no fluid flow in the conduit. The reference mark 7 may be used with the position of the member 5 and its band 6 to determine, by the position of member 5 relatively to mark 7, whether or not fluid is flowing in the conduit.

It will be understood that various changes in the details, materials and arrangements of parts, which have been herein described and illustrated in order to explain the nature of the invention, may be made by those skilled in the art within the principle and scope of the invention as expressed in the appended claims.

I claim:

1. A fluid flow indicator comprising a conduit having two spaced apart sections of identical bores, an intermediate conduit interconnecting said conduit sections, said intermediate conduit having a bore of larger cross section than that of said conduit sections and being of transparent material, an indicator in said intermediate section of a cross sectional area greater than that of said conduit sections but less than that of said intermediate section and holding means interconnecting said conduit sections, said holding means having a viewing window therein.

2. The indicator as set forth in claim 1, wherein said indicator has a passage through it in a direction lengthwise of said intermediate section.

3. The indicator as set forth in claim 1 wherein said indicator has a reference mark which is visible through said viewing window.

4. The indicator as set forth in claim 3, wherein said reference mark is a peripheral channel band, less than the length of the indicator filled with a colored coating.

References Cited in the file of this patent

UNITED STATES PATENTS

| 2,827,008 | Hodges | Mar. 18, 1958 |

FOREIGN PATENTS

| 687,766 | Germany | Feb. 5, 1940 |
| 59,690 | Denmark | Apr. 20, 1942 |
| 907,465 | Germany | Mar. 25, 1954 |